United States Patent
Pichon et al.

(10) Patent No.: US 7,447,344 B2
(45) Date of Patent: Nov. 4, 2008

(54) SYSTEM AND METHOD FOR VISUALIZATION OF PULMONARY EMBOLI FROM HIGH-RESOLUTION COMPUTED TOMOGRAPHY IMAGES

(75) Inventors: Eric Pichon, Balma (FR); Carol L. Novak, Newtown, PA (US); Atilla Peter Kiraly, Plainsboro, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 717 days.

(21) Appl. No.: 11/103,108

(22) Filed: Apr. 11, 2005

(65) Prior Publication Data

US 2005/0240094 A1 Oct. 27, 2005

Related U.S. Application Data

(60) Provisional application No. 60/563,063, filed on Apr. 16, 2004, provisional application No. 60/587,801, filed on Jul. 14, 2004.

(51) Int. Cl.
G06K 9/00 (2006.01)
(52) U.S. Cl. .................. 382/130; 382/128; 382/131; 382/257; 382/259
(58) Field of Classification Search ............... 382/128, 382/131, 130, 256, 257, 258, 154, 173, 180; 600/407; 345/419, 589; 348/32, 33, 34
See application file for complete search history.

(56) References Cited

U.S. PATENT DOCUMENTS

2001/0031920 A1 * 10/2001 Kaufman et al. ............ 382/130

OTHER PUBLICATIONS

Masutani et al. "Computerized Detection of Pulmonary Embolism in Spiral CT Angiography Based on Volumetric Image Analysis", Dec. 2002, IEEE Transactions on Medical Imaging, vol. 21, pp. 1517-1523.*

Masutani et al., "Computer-assisted detection of pulmonary embolism", 2000, SPIE Medical Imaging 2000: Image Processing, vol. 3979, pp. 944-950.*

* cited by examiner

*Primary Examiner*—Brian Q Le
*Assistant Examiner*—Pierre Diverse
(74) *Attorney, Agent, or Firm*—Donald B. Paschburg; F. Chau & Associates, LLC

(57) ABSTRACT

A system and method for visualizing a tree structure in medical image data is provided. The method comprises: segmenting the tree structure in the image data (230-265); coloring an exterior of the tree structure using data associated with interior components of the tree structure (270-290); and outputting an image of the tree structure colored by the interior components of the tree structure (295).

21 Claims, 16 Drawing Sheets

(a)
 (b)
 (c)
 (d)

(a) (b)

(a) (b)

(a)

(a) (b)

(c) (d)

(a)

(b)

(c)

(d)

(e)

(f)

(a)

(a) (b)

(a)

(b)

(c)

(d)

(a)          (b)

(c)          (d)

SYSTEM AND METHOD FOR VISUALIZATION OF PULMONARY EMBOLI FROM HIGH-RESOLUTION COMPUTED TOMOGRAPHY IMAGES

CROSS-REFERENCE TO RELATED APPLICATION

This application claims the benefit of U.S. Provisional Application Nos. 60/563,063, filed Apr. 16, 2004 and 60/587,801, filed Jul. 14, 2004, copies of which are herein incorporated by reference.

BACKGROUND OF THE INVENTION

1. Technical Field

The present invention relates to medical image analysis, and more particularly, to a system and method for visualizing pulmonary emboli from high-resolution computed tomography (CT) images.

2. Discussion of the Related Art

A deep vein thrombosis (DVT) is a blood clot in a vein located deep in the muscles of the legs, thighs, pelvis or arms. A pulmonary embolism occurs when a piece of a blood clot from a DVT breaks off and travels to an artery in a lung where it blocks the artery and damages the lung. This short-term complication is potentially life threatening and occurs in about 10% of patients with acute DVT events. It may be even more common than generally realized because a majority of embolisms occur without symptoms.

Several factors are known to cause DVTs, these are: an injury to the vein, slowing of blood flow and conditions that increase the tendency for the blood to clot. The most common cause of an injury to a vein is a trauma to the leg such as that which occurs with broken bones, severe muscle injury or surgery. Immobilization is the most common cause of slow blood flow in a vein as movement of the leg muscles helps to keep blood flowing through deep veins.

The majority of people recover fully from a DVT and pulmonary embolism. However, a large pulmonary embolism can block almost all of the blood flow to the lungs and cause sudden death. In addition, a pulmonary embolism can put a severe strain on the heart. A pulmonary embolism is a common disorder with an annual incidence rate of 23 to 69 per 100,000 people in the United States. Up to 60,000 Americans each year die because of a pulmonary embolism. After ischemic heart disease and stroke, a pulmonary embolism is the third leading cause of death from heart disease, and may be the most common preventable cause of death in hospitals. Further, in at least two-thirds of cases, a pulmonary embolism had not been suspected prior to death.

A pulmonary embolism is a difficult disease to diagnose as the symptoms are non-specific. Many patients with a pulmonary embolism are never examined and the majority of patients suspected of having a pulmonary embolism do not have the disease. A pulmonary embolism is often, but not invariably, associated with lower extremity venous thrombosis. Prompt diagnosis of pulmonary embolism is a major concern because an untreated pulmonary embolism is potentially fatal. Accurate diagnosis is also important because unnecessary treatment with anticoagulants has been shown to have a high degree of morbidity and mortality.

Contrast-enhanced computed tomography (CT) techniques are increasingly being used to diagnose a pulmonary embolism. In such techniques, a contrast agent such as an iodine-containing dye is injected into an arm vein of a patient while the patient is scanned in a spiral CT scanner during a single breath-hold. This scan is very rapid, typically taking less than 30 seconds, and the resulting images are frequently returned to a doctor within 30 minutes of the scan being ordered. Other advantages of a spiral CT scan are its non-invasive nature and its effectiveness at diagnosing the majority of pulmonary emboli that are in the main branches of the pulmonary arteries. In addition, a spiral CT scan directly shows a clot obstructing a vessel or contrast streaming around a partially occluded embolus. Further, the spiral CT scan shows the parenchymal changes of a pulmonary embolism better than radiographs, and often provides an alternative diagnosis when a pulmonary embolism is not present.

Earlier generations of spiral CT scanners performed poorly in detecting pulmonary emboli in the smaller arteries of the lung in which 16 to 30% of all pulmonary emboli occur. The recent introduction of 16-slice spiral CT machines has enabled patients to be scanned in sufficiently high detail to allow physicians visualize the smaller arteries to confirm or rule out the presence of an embolus. However, the large size of these datasets, typically around $512^3$ points, has increased the time it takes to analyze CT images. Accordingly, there is a need for an automated technique that rapidly and accurately locates pulmonary emboli candidates in large CT datasets.

SUMMARY OF THE INVENTION

The present invention overcomes the foregoing and other problems encountered in the known teachings by providing a system and method for visualizing pulmonary emboli from high-resolution computed tomography (CT) images.

In one embodiment of the present invention, a method for visualizing a tree structure in medical image data comprises: segmenting the tree structure in the image data; coloring an exterior of the tree structure using data associated with interior components of the tree structure; and outputting an image of the tree structure colored by the interior components of the tree structure. The tree structure is a vessel tree. The vessel tree is a pulmonary vessel tree.

The step of segmenting the tree structure comprises: generating a mask of a lung; thresholding components within the lung mask; size-labeling voxels in the thresholded lung mask according to a radius of the tree structure; removing voxels with size labels below a first threshold; labeling connected components within the thresholded lung mask; and removing components below a second threshold in volume.

The step of size-labeling voxels in the thresholded lung mask comprises: labeling the voxels in the tree structure with their distance from a surface of the tree structure; determining a path to a centerline of a vessel in the tree structure for the labeled voxels; and assigning a largest distance value along the path to all voxels in the path.

The step of coloring an exterior of the tree structure comprises: determining a path to a vessel centerline for voxels on a surface of the tree structure; determining a function result based on voxel values along the path; and assigning the function result to the surface of the tree structure. The value of the voxels along the path is one of an average function, minimum function and function of a first quartile of path values.

The step of coloring an exterior of the tree structure further comprises removing false positive regions using a classifier. The step of removing false positive regions using a classifier comprises: collecting features of the image data, wherein the features of the image data are one of sizes and gray-level values inside the tree structure; and removing false positives using the classifier, wherein the classifier includes a gray-level operator for removing false positive regions based on their size.

The image data is acquired using one of a CT, helical CT and magnetic resonance (MR) imaging technique. The interior components of the tree structure are one of an embolism and airway plug.

In another embodiment of the present invention, a method for size-labeling voxels in a tree structure of three-dimensional (3D) medical image data comprises: labeling the voxels in the tree structure with their distance from a surface of the tree structure; determining a path to a centerline of a branch in the tree structure for the labeled voxels; and assigning a largest distance value along the path to all voxels in the path.

The method further comprises: applying voxels size-labeled according to a radius of the branch to a segmented image of the tree structure; and coloring an exterior of the tree structure using data associated with interior components of the tree structure. The method further comprises outputting an image of the tree structure colored by the interior components of the tree structure.

The tree structure is a pulmonary vessel tree. The pulmonary vessel tree is visualized to detect the presence of pulmonary emboli or to rule out the presence of pulmonary emboli in the pulmonary vessel tree.

In yet another embodiment of the present invention, a system for visualizing a tree structure in medical image data comprises: a memory device for storing a program; a processor in communication with the memory device, the processor operative with the program to: segment the tree structure in the image data; color an exterior of the tree structure using data associated with interior components of the tree structure; and output an image of the tree structure colored by the interior components of the tree structure.

The processor is further operative with the program code to: generate a mask of a lung, when the tree structure is a pulmonary vessel tree; threshold components within the lung mask; size-label voxels in the thresholded lung mask according to a radius of the tree structure; remove voxels with size labels below a first threshold; label connected components within the thresholded lung mask; and remove components below a second threshold in volume.

The processor is further operative with the program code when size-labeling voxels in the thresholded lung mask to: label the voxels in the tree structure with their distance from a surface of the tree structure; determine a path to a centerline of a vessel in the tree structure for the labeled voxels; and assign a largest distance value along the path to all voxels in the path.

The processor is further operative with the program code when coloring an exterior of the tree structure to: determine a path to a vessel centerline for voxels on a surface of the tree structure; determine a function result based on voxel values along the path; and assign the function result to the surface of the tree structure.

The processor is further operative with the program code when coloring an exterior of the tree structure to remove false positive regions using a classifier. The processor is further operative with the program code when removing false positive regions using a classifier to: collect features of the image data, wherein the features of the image data are one of sizes and gray-level values inside the tree structure; and remove false positives using the classifier, wherein the classifier includes a gray-level operator for removing false positive regions based on their size.

The image data is acquired using one of a CT, helical CT and MR imaging device.

In another embodiment of the present invention, a system for size-labeling voxels in a tree structure of 3D medical image data comprises: a memory device for storing a program; a processor in communication with the memory device, the processor operative with the program to: label the voxels in the tree structure with their distance from a surface of the tree structure; determine a path to a centerline of a branch in the tree structure for the labeled voxels; and assign a largest distance value along the path to all voxels in the path.

The processor is further operative with the program code to: apply voxels size-labeled according to a radius of the branch to a segmented image of the tree structure; color an exterior of the tree structure using data associated with interior components of the tree structure; and output an image of the tree structure colored by the interior components of the tree structure.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

DETAILED DESCRIPTION OF EXEMPLARY EMBODIMENTS

Figure 1:
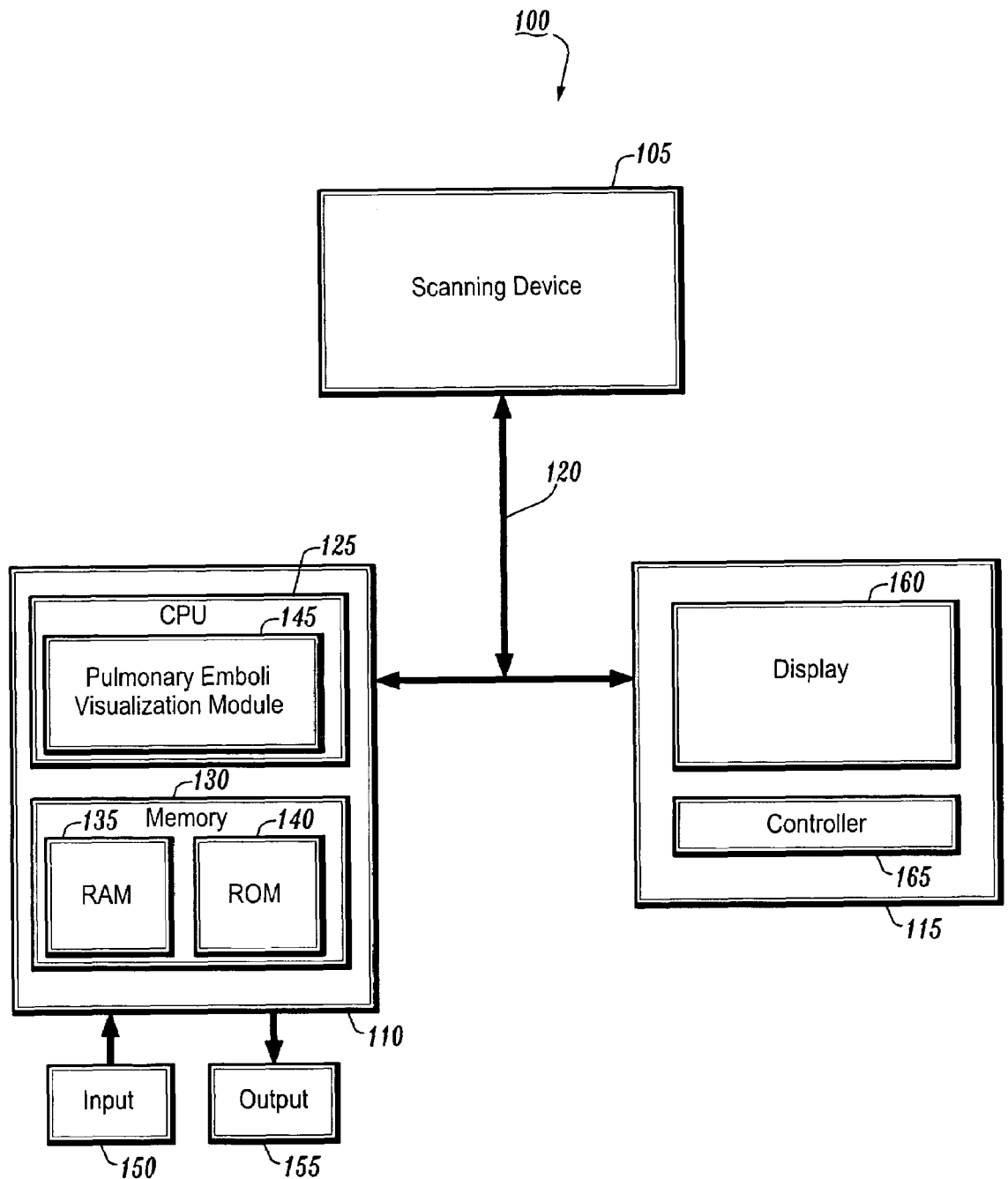
FIG. 1 is a block diagram of a system for visualizing pulmonary emboli from high-resolution computed tomography (CT) images according to an exemplary embodiment of the present invention.

FIG. 1 is a block diagram of a system 100 for visualizing pulmonary emboli from high-resolution computed tomography (CT) images according to an exemplary embodiment of the present invention. As shown in FIG. 1, the system 100 includes, inter alia, a scanning device 105, a personal computer (PC) 110 and an operator's console 115 connected over, for example, an Ethernet network 120. The scanning device 105 may be a magnetic resonance (MR) imaging device, a CT imaging device, a helical CT device, a positron emission tomography (PET) device, a two-dimensional (2D) or three-dimensional (3D) fluoroscopic imaging device, a 2D, 3D, or four-dimensional (4D) ultrasound imaging device, or an x-ray device.

The PC 110, which may be a portable or laptop computer, a personal digital assistant (PDA), etc., includes a central processing unit (CPU) 125 and a memory 130, which are connected to an input 150 and an output 155. The CPU 125 includes a pulmonary emboli visualization module 145 that includes one or more methods for visualizing pulmonary emboli from high-resolution CT images.

The memory 130 includes a random access memory (RAM) 135 and a read only memory (ROM) 140. The memory 130 can also include a database, disk drive, tape drive, etc., or a combination thereof. The RAM 135 functions as a data memory that stores data used during execution of a program in the CPU 125 and is used as a work area. The ROM 140 functions as a program memory for storing a program executed in the CPU 125. The input 150 is constituted by a keyboard, mouse, etc., and the output 155 is constituted by a liquid crystal display (LCD), cathode ray tube (CRT) display, or printer.

The operation of the system 100 is controlled from the operator's console 115, which includes a controller 165, for example, a keyboard, and a display 160, for example, a CRT display. The operator's console 115 communicates with the PC 110 and the scanning device 105 so that 2D image data collected by the scanning device 105 can be rendered into 3D data by the PC 110 and viewed on the display 160. It is to be understood that the PC 110 can be configured to operate and display information provided by the scanning device 105 absent the operator's console 115, using, for example, the input 150 and output 155 devices to execute certain tasks performed by the controller 165 and display 160.

The operator's console 115 further includes any suitable image rendering system/tool/application that can process digital image data of an acquired image dataset (or portion thereof) to generate and display 2D and/or 3D images on the display 160. More specifically, the image rendering system may be an application that provides 2D/3D rendering and visualization of medical image data, and which executes on a general purpose or specific computer workstation. Moreover, the image rendering system enables a user to navigate through a 3D image or a plurality of 2D image slices. The PC 110 may also include an image rendering system/tool/application for processing digital image data of an acquired image dataset to generate and display 2D and/or 3D images.

As shown in FIG. 1, the pulmonary emboli visualization module 145 may also be used by the PC 110 to receive and process digital medical image data, which as noted above, may be in the form of raw image data, 2D reconstructed data (e.g., axial slices), or 3D reconstructed data such as volumetric image data or multiplanar reformats, or any combination of such formats. The data processing results can be output from the PC 110 via the network 120 to an image rendering system in the operator's console 115 for generating 2D and/or 3D renderings of image data in accordance with the data processing results, such as segmentation of organs or anatomical structures, color or intensity variations, and so forth.

It is to be understood that computer-aided diagnosis or detection (CAD) systems and methods of the present invention may be implemented as extensions or alternatives to conventional CAD methods or other automated visualization and detection methods for processing image data. It is to be further understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture.

Figure 2:
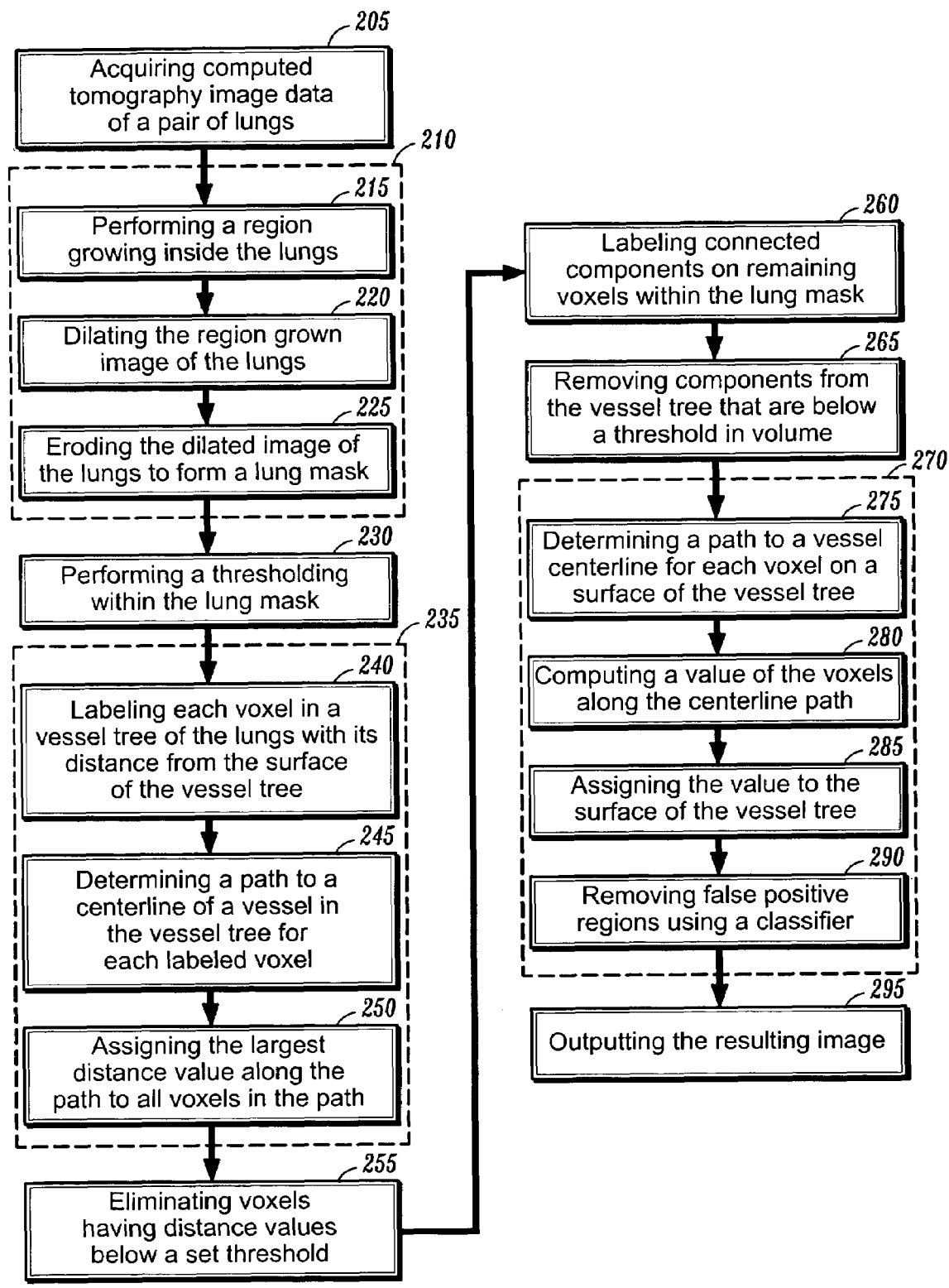
FIG. 2 is a flowchart illustrating a method for visualizing pulmonary emboli from high-resolution CT images according to an exemplary embodiment of the present invention.
Figure 3:
FIG. 3 is a set of images illustrating generating a lung mask according to an exemplary embodiment of the present invention.
Figure 3:
Figure 3:
Figure 3:

FIG. 2 is a flowchart showing an operation of a method for visualizing pulmonary emboli from high-resolution CT images according to an exemplary embodiment of the present invention. As shown in FIG. 2, CT image data is acquired from a pair of lungs inside a patient (205). This is accomplished by using the scanning device 105, in this example a CT scanner, which is operated at the operator's console 115, to scan the patient's lungs thereby generating a series of 2D image slices associated with the lungs. The 2D image slices of the lungs are then combined to form a 3D image, a coronal slice of which is shown in (a) of FIG. 3. In addition to the lungs, it is to be understood that the CT image data can be any one of a leg, arm, brain or other body part containing blood vessels. In addition, other types of data such as MR image data may be used in accordance with the present invention.

After the CT image data is acquired from the lungs, a lung mask is generated (210). This is accomplished by performing a region growing from a seed point in the trachea to segment air inside the lungs (215). An example of this is shown in (b) of FIG. 3. Other techniques such as thresholding, Gaussian smoothing, edge detection, and connected component labeling may be used to segment the air inside the lungs. After segmenting the air inside the lungs, the segmented image of the lungs is dilated (220). During this step, the segmented image is dilated using a Euclidean sphere of, for example, 10 mm, to fill in holes in the lungs caused by pulmonary vessels. An example of the dilated image is shown in (c) of FIG. 3.

Figure 4:
FIG. 4 is a pair of images illustrating a three-dimensional (3D) view of the lung mask of FIG. 3.
Figure 4:
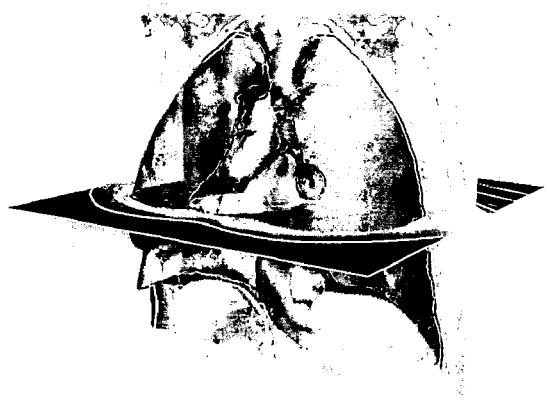

Once the segmented image has been dilated, it is eroded to form the lung mask (225). In this step, a morphological erosion filter employing a Euclidean sphere of, for example, 12 mm, is used to avoid surrounding bone structures such as ribs. An example of the lung mask or final segmentation of the original CT data is shown in (d) of FIG. 3. As shown in (d) of FIG. 3, the resulting lung mask is slightly within the lungs. This is acceptable for use with the present invention as pulmonary emboli exclusively occur within the lungs. Images (a) and (b) of FIG. 4 are further presented to illustrate 3D views of the lung mask. It is to be understood that other methods for generating the lung mask may be used in accordance with the present invention. For example, those that employ thresholding or morphology or those that trace contours around the lungs may be used.

Figure 5:
FIG. 5 is a pair of images illustrating performing a thresholding within a lung mask according to an exemplary embodiment of the present invention.
Figure 5:
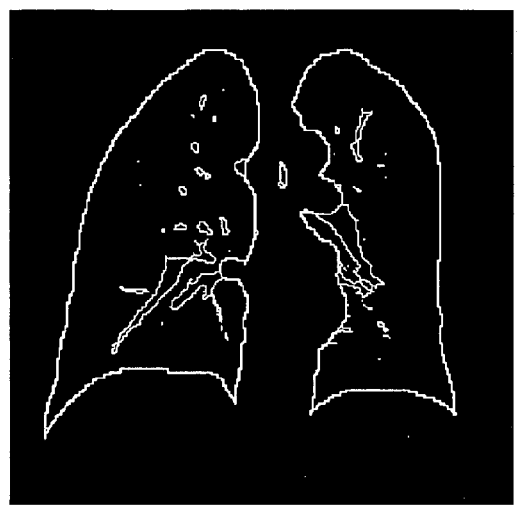
Figure 6:
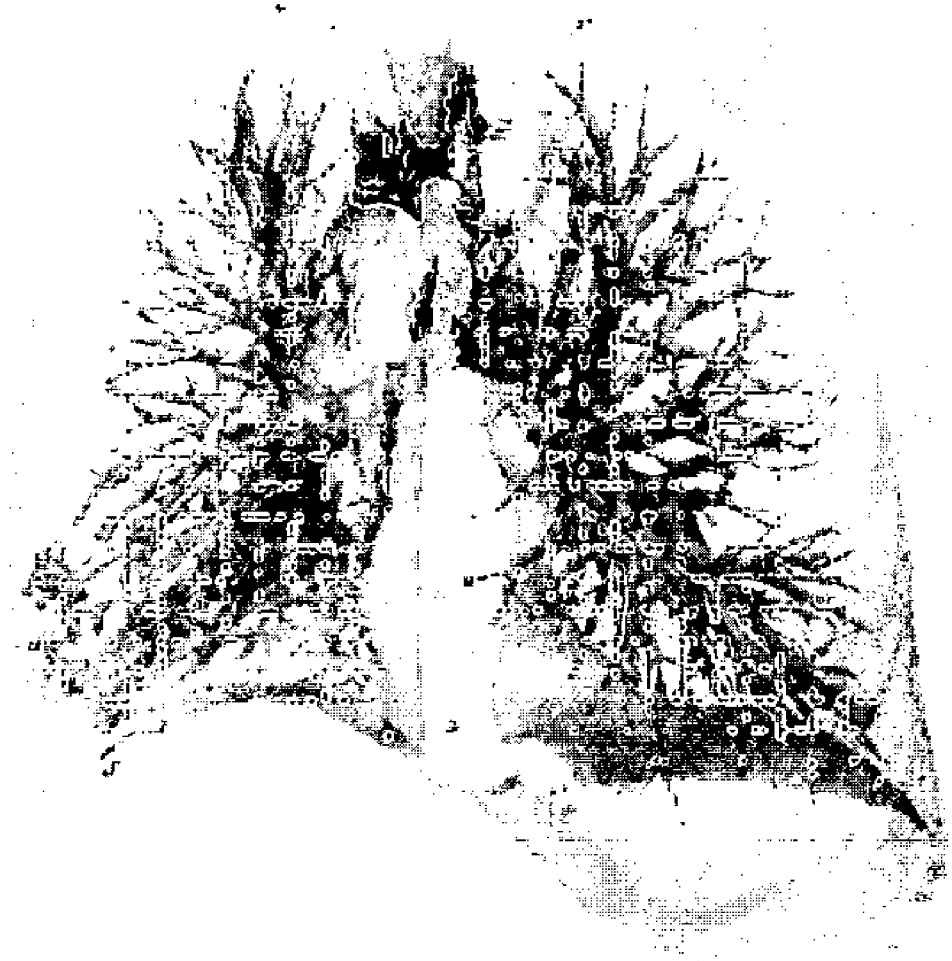
FIG. 6 is a 3D view of the thresholded image of FIG. 5.

After generating the lung mask, a segmentation of a pulmonary vessel tree in the lungs is performed. This is accomplished by first performing a thresholding of all voxels above a predefined density within the lung mask (230). Because pulmonary emboli typically block the flow of contrast, the density should be defined such that it is low enough to capture both vessels filled with contrast-enhanced blood and vessels without contrast. The results of the thresholding are shown in (b) of FIG. 5. As shown in FIG. 5, (a) shows the lung mask, which defines where the thresholding will take place, and (b) shows data captured by the thresholding. Image (a) of FIG. 6 is a 3D view of (b) of FIG. 5. Once the thresholding is complete, each voxel in the segmented vessel tree is size-labeled according to the radius of the vessel (235).

Figure 7:
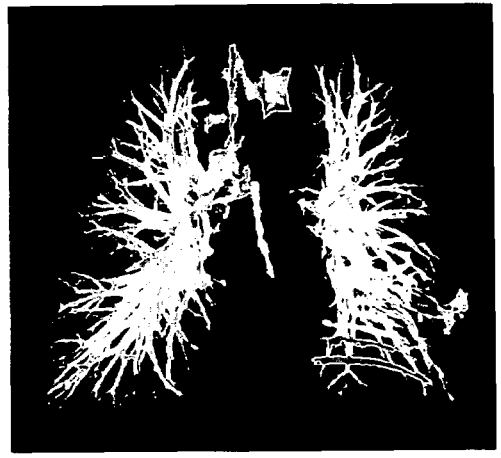
FIG. 7 is a set of thresholded images colored by their components and 3D views of size-labeled voxels thereof according to an exemplary embodiment of the present invention.
Figure 7:
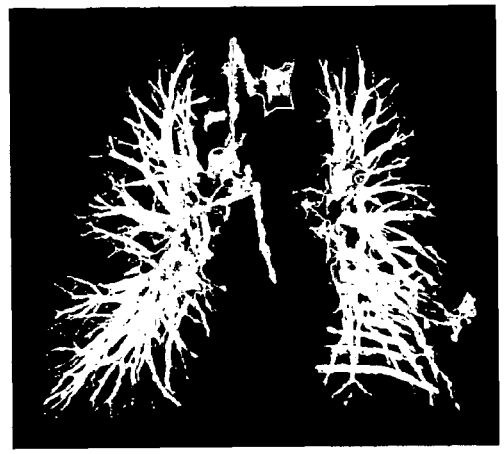
Figure 7:
Figure 7:
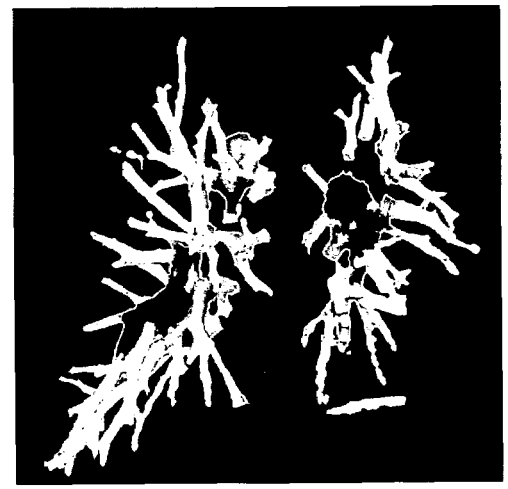

In order to size-label each segmented voxel, each voxel is first labeled by its distance from the surface of the vessel tree (240). Then, for each voxel that has been labeled, a path to a centerline of a vessel in the vessel tree is determined (245) and a largest distance value along the path is assigned to all voxels in the path (250). This value is the radius of the vessel at that location. Images (b) and (d) of FIG. 7 illustrate 3D views of the size-labeled voxels. Lighter shades represent smaller vessel radii while darker shades represent larger vessel radii. Images (a) and (c) of FIG. 7 represent the original thresholded data colored by separate connected components.

All voxels with distance values below a set threshold are then eliminated from the segmentation (255). Connected component labeling of the voxels remaining within the lung mask previously labeled according to their connectivity is then performed (260). This may be performed as all voxels in a connected component are part of the same vessel sub-tree and of a minimum size. Thus, once all groups of connected components have been determined, each voxel is labeled with a gray-level or a color according to the component it was assigned. After the connected components have been labeled, small volume components are removed (265). In other words, components that are below predetermined threshold in volume are removed. An example of the segmentation after small volume components are removed is shown in (d) of FIG. 7.

After removing the small-volume components, the segmentation of the vessel tree is complete. In accordance with the present invention, other techniques for vessel segmentation such as vessel-tracking or those based on filtering an image to highlight vessels may be used. In addition, although a vessel tree was segmented in the above example, a bronchial tree may be segmented using the same or similar techniques. Now the outside of the vessel tree is colored using its inner components (270). It is to be understood that when coloring the outside of the vessel tree with its inner components, each surface element reflects the values of its interior voxels that form a path to a corresponding interior-most part of the vessel tree. Thus, as pulmonary emboli are clots of significantly lower Hounsfield units or density values than surrounding contrast enhanced blood, they appear as salient contrasted patches when rendered as such.

Figure 8:
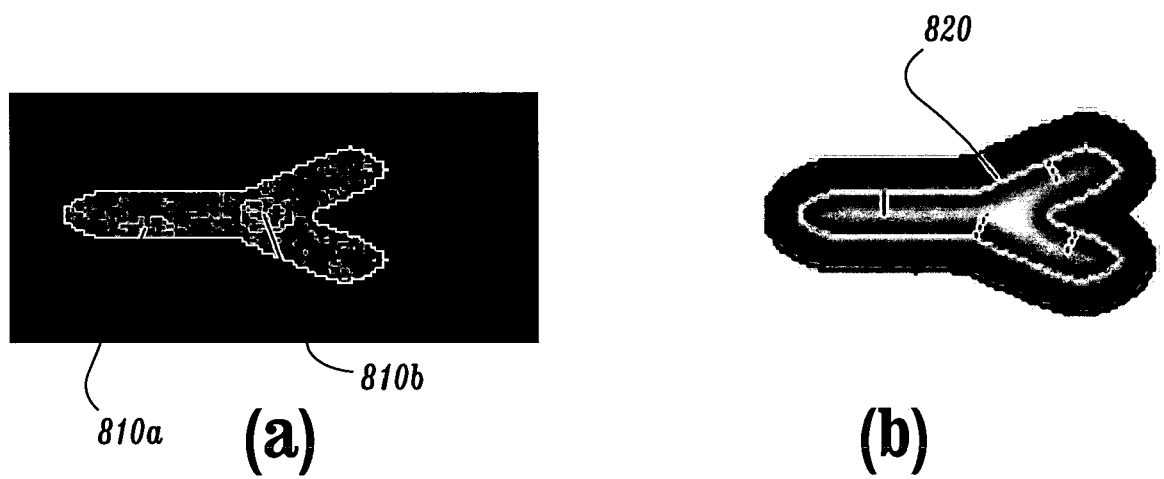
FIG. 8 is a pair of images illustrating a two-dimensional (2D) slice of a synthetic image of a vessel with two emboli and a signed distance transform of the segmentation of the same image with paths being shown from the segmentation surface to a centerline according to an exemplary embodiment of the present invention.

The vessel tree is colored using its inner components by first determining a path to a vessel centerline for each voxel on a surface of the vessel tree (275), computing a function of the voxel values along the centerline path (280) and assigning the result of the function to the surface of the vessel tree (285). An example of the process in step (275) is shown for a synthetic dataset of FIG. 8. Image (a) of FIG. 8 shows a cross-section of a synthetic image with simulated pulmonary emboli 810a,b therein. Image (b) of FIG. 8 illustrates a segmentation and a signed distance map, and a series of example paths computed toward the center. The white outline 820 indicates the edge of a previous vessel segmentation or surface from where the paths are computed.

Figure 9:
FIG. 9 is a set of images illustrating results for visualizing pulmonary emboli in synthetic data according to an exemplary embodiment of the present invention.
Figure 9:
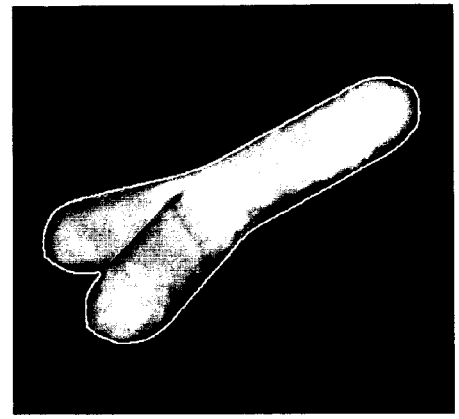
Figure 9:
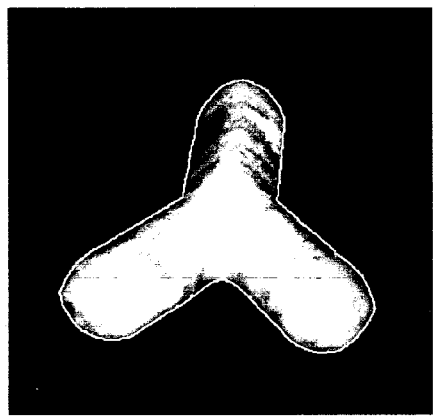
Figure 9:
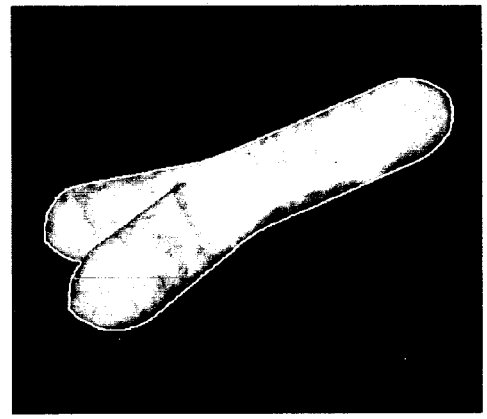
Figure 9:
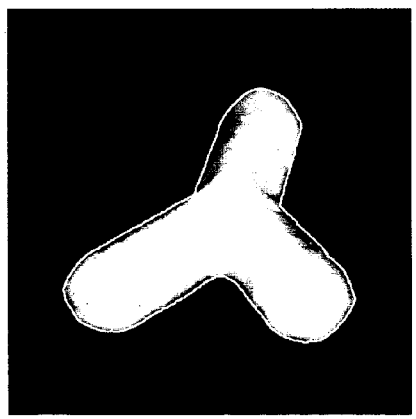
Figure 9:
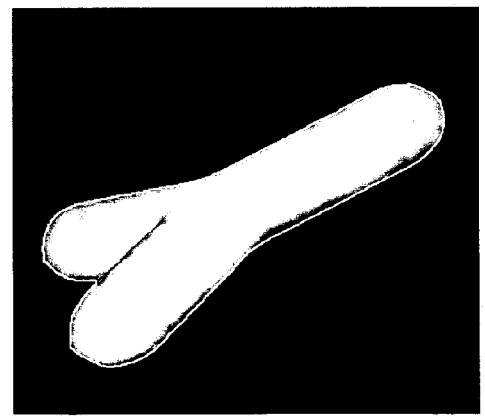

Results of the steps up to step (285) for synthetic data with different functions are shown in (a-f) of FIG. 9. Thus, in addition to the mapping already discussed, direct mapping or different color mappings using varying functions may take place. In (a-f) of FIG. 9, outer surface coloring is shown with its intensity inverted with respect to the original synthetic data of (a) of FIG. 8. In other words, bright white spots on the surface of the synthetic vessel in FIG. 9 correspond to dark emboli seen in the cross-section view (a) of FIG. 8. For example, (a) and (b) of FIG. 9 show the result of an average function, (c) and (d) of FIG. 9 show a function of the first quartile of path values and (e) and (f) of FIG. 9 show a minimum function. An application of these techniques to a real dataset is shown in FIG. 10.

Figure 10:
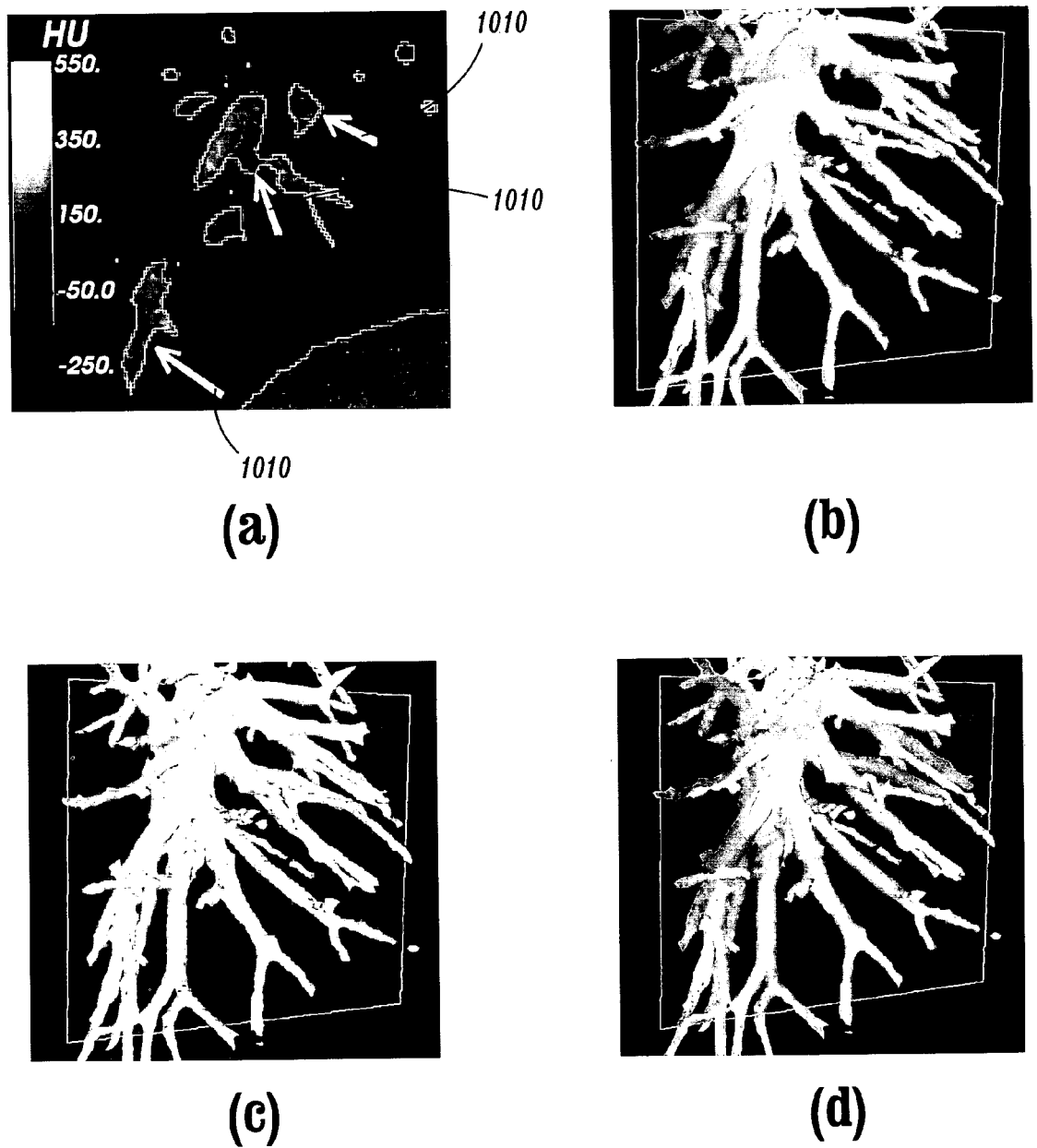
FIG. 10 is a set of images illustrating an original real dataset and results for visualizing pulmonary emboli in the real dataset according to an exemplary embodiment of the present invention.
Figure 11:
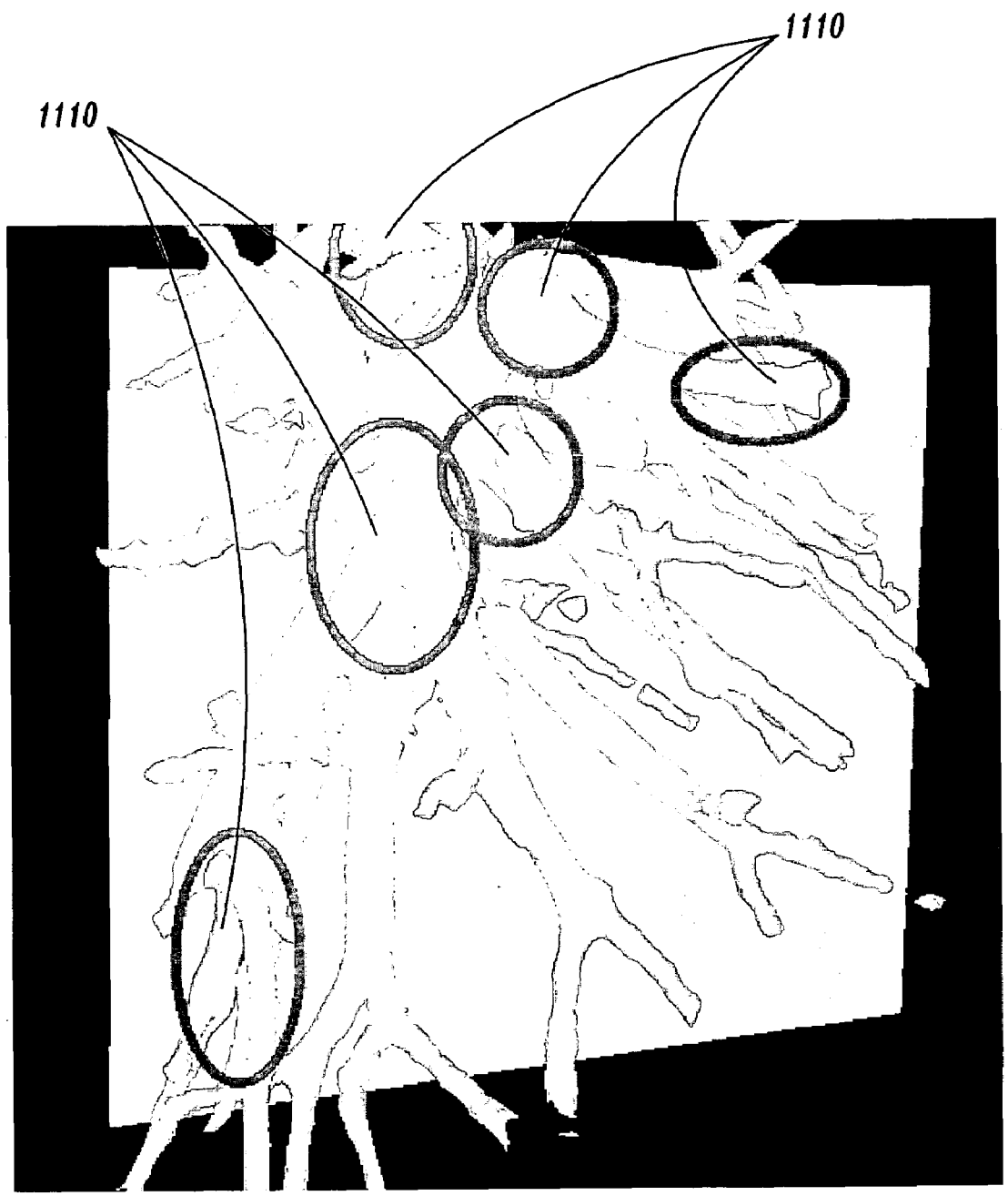
FIG. 11 is a zoomed-in view of an image of FIG. 10 colored by a function of its interior components.

FIG. 10 illustrates the results of a real dataset using similar mapping techniques. For example, (a) of FIG. 10 shows a slice of original data, with portions of the pulmonary arteries having three emboli noted by the arrows 1010. Images (b-d) of FIG. 10 show the result of the average function, minimum function and first quartile function, respectively. As can be seen, the first quartile function shows an optimal result. After assigning the values to the surface of the vessel tree, a rendered image of the vessel tree colored by its interior components may be output to a display for analysis as shown, for example, in (a) of FIG. 11 (295). Image (a) of FIG. 11, which is a zoomed-in view of (d) of FIG. 10, shows the first quartile rendering of pulmonary vessels with several pulmonary emboli 1110. The pulmonary embolus locations 1110 are easily identified by a medical practitioner observing the bright areas of the surface.

Figure 12:
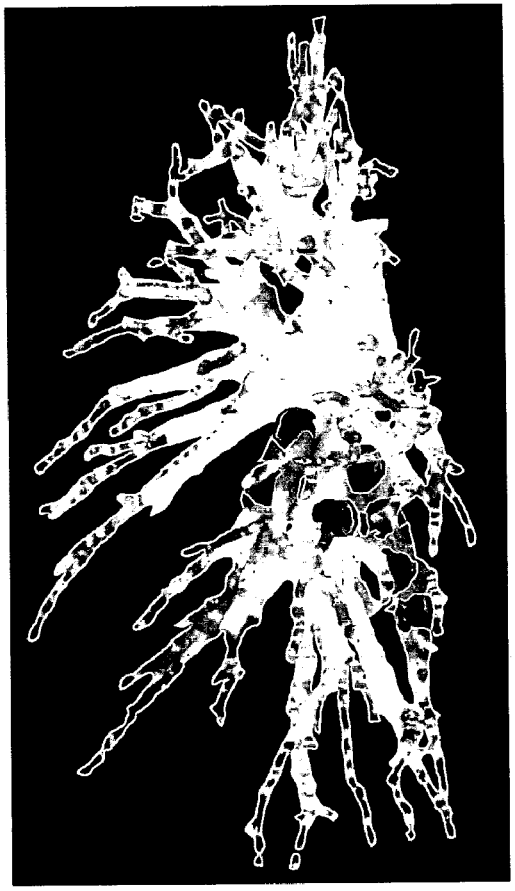
FIG. 12 is a pair of images illustrating a surface visualization of pulmonary emboli with and without using a classifier according to an exemplary embodiment of the present invention.
Figure 12:
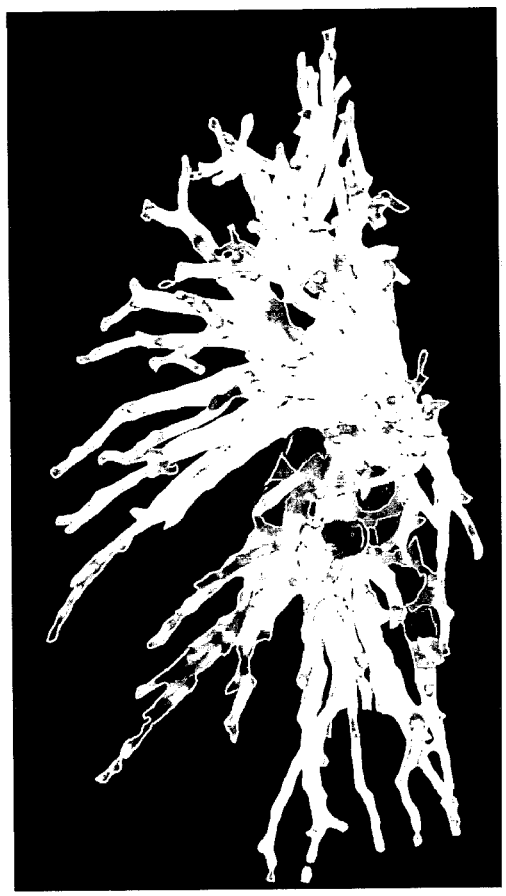

Prior to outputting the rendered image for analysis, however, false positives may be removed using a classifier (290). For example, as shown in (a) of FIG. 12, the pulmonary emboli visualization described in steps (205-285) produces a surface shaded model or image of a pulmonary vascular tree for user interaction. In this example, a direct mapping is employed such that pulmonary emboli regions inside vessels appear as dark spots on the surface rendering of the exterior of the vessel tree. As shown in (a), spheres indicate actual pulmonary emboli locations marked by a physician, and shaded regions without accompanying spheres indicate either veins or false positives.

In order to remove most, if not all, of the false positive shaded regions while retaining shaded regions adjacent to the spheres, a classifier is applied. This is done by collecting features of the CT image and intermediate data as it undergoes steps (205-285). The collected features may be, for example, sizes of the shaded regions and gray-level values inside the vessel. The collected features then undergo a classification step to eliminate false positives. In other words, a classifier, which may include a gray-level opening operator, is used to eliminate the shaded regions based on their size; hence, the feature under consideration is the size of the shaded regions. An example of this is illustrated in (b) of FIG. 12. As shown in (b) of FIG. 12, many smaller shaded regions that occur due to partial volume effects near smaller vessels are removed thus making the vessel tree easier to analyze.

A description of distance maps, techniques used to calculate them and their applicability to the present invention will follow. More specifically, the use of distance maps when performing morphological operations with a structure element such as a Euclidean ball, determining paths from outside a tubular structure to its medial axis or medial surface and defining an extension of a radius for general non-necessarily cylindrical tubular structures will follow.

Given a binary shape S: R^3->{0, 1}, one can define a distance map D: R^3-> R^+, D(p)=min_{q/S(q)=1} d(p,q). Thus, for any voxel p, D(p) is the distance from p to the closest point of the shape S. In what follows, only the case where d(.,.) is the standard Euclidean distance, will be discussed. In addition, illustrations in 2D will only be used. However, the methods to be discussed may remain valid in any dimension. Further, it is to be understood that the 2D medial line extends in 3D to a medial surface. Only in degenerate cases where a cylinder or sphere is used will the medial manifold be of a dimension higher than one.

In the above techniques for visualizing pulmonary emboli from high-resolution CT images, the Fast Marching algorithm has been used to create the distance maps. Saito's method may also be used to create these distance maps. The Fast Marching algorithm was initially created for curve and surface evolution. The Fast Marching algorithm can also be used to generate distance maps if one sets the velocity uniformly to one; then the arrival time map is the desired distance map. In addition, a signed distance, which applies a negative sign to voxels inside the shape, may be used.

Figure 13:
FIG. 13 is a set of images illustrating morphological operations performed on an original shape and a corresponding distance map according to an exemplary embodiment of the present invention.
Figure 13:
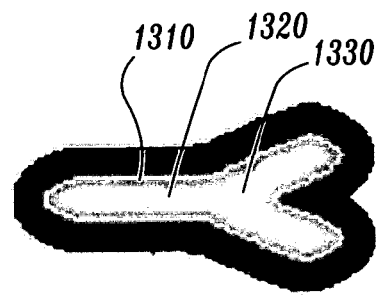
Figure 13:
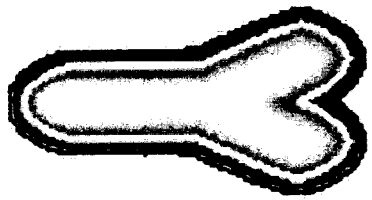
Figure 13:
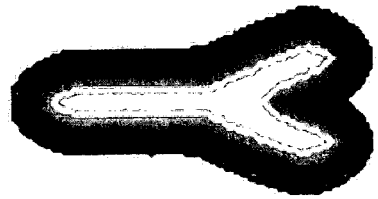

An example original shape and its corresponding distance map are shown in (a) and (b) of FIG. 13, respectively. As shown in (b) the contour of the original shape is shown in white 1310 and distance values 1320 and 1330 are shown in different shades of gray. It is to be understood that what is represented is actually the distance map to the border of the gray shape and not the shape itself. Otherwise, it would be uniform to zero inside the shape. Using such a distance map one can perform morphological erosions and dilation by thresholding the distance map.

For example, a threshold of +2.0 will correspond to a dilation with a Euclidean ball of radius 2.0 as shown in (c) of FIG. 13. A threshold of −1.0 will correspond to an erosion with a Euclidean ball of radius 1.0 as shown in image (d) of FIG. 13. As can be observed, this is a very efficient way to perform erosions and dilation. In addition, the cost of the operation does not depend on the size of the structure element. This is particularly useful when using large Euclidean balls.

Figure 14:
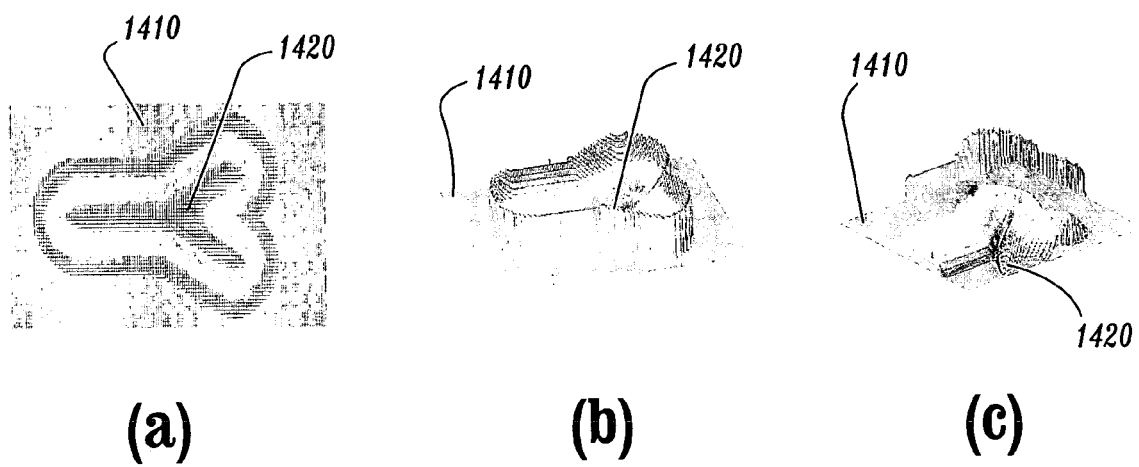
FIG. 14 is a set of images illustrating a distance map of FIG. 13 represented as a surface.

In order to determine a path to the medial axis, if one represents the distance map as a surface it will be noticed that the path of steepest descent inside the shape corresponds to moving away as fast as possible from the boundary. Images (a-c) of FIG. 14 show the distance map represented as a surface. For example, the altitude of a point p represents the distance from this point to the curve, and a plane 1410 corresponds to an altitude of zero. As can be seen, the distance map was not computed far away from the curve. As further shown in FIG. 14, the regular points of the surface have a gradient of 1 and ridges 1420 that correspond to the medial axis. The ridges are the points where one cannot move away from without getting closer to an opposite boundary.

Figure 15:
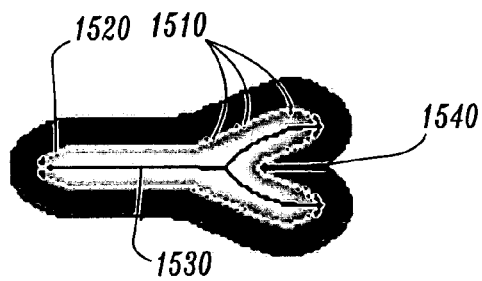
FIG. 15 is a set of images illustrating determining the shortest path from a point to a medial axis in a distance mapped image according to an exemplary embodiment of the present invention.
Figure 15:
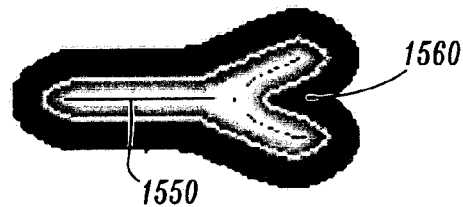
Figure 15:
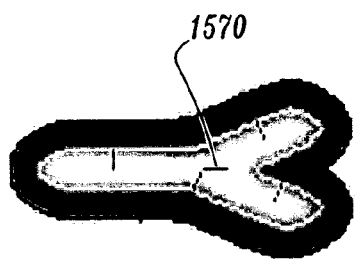
Figure 15:
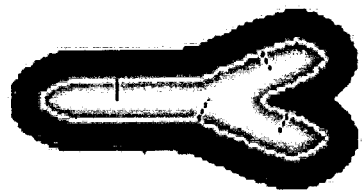

Another technique for determining the shortest path from a point to the medial axis is to follow the steepest descent. Values of the distance map are not-necessarily constant along a center ridge. An example of where this occurs is in a 3D cone or a 2D triangle. In this case one might follow the ridge to determine the shortest path from a point to the medial axis. However, the values will not decrease as fast on the ridge as they would at regular points. An application of this technique is shown in images (a) and (b) of FIG. 15 where black points 1510-1560 represent points where the norms of the gradients are below a certain threshold (e.g., where the medial axis is defined). As shown in image (a) the norm of the gradient is smaller than 0.9 and in image (b) the norm of the gradient is smaller than 0.5. Due to discretization, a few erroneous points are visible on the border indicated in white.

A more robust strategy to determine the shortest path from a point to the medial axis, and not follow it after it has been reached, is to follow the steepest descent and stop when the value at the current point is smaller than the total current length of the path. An example of this is shown in images (c) and (d) of FIG. 15. For example, in image (c), the steepest descent path follows the ridge near the triple point giving an erroneous result 1570. However, by using the strategy of stopping when the value at the current point is smaller than the path length, an erroneous result does not occur as shown in (d) of FIG. 15.

Figure 16:
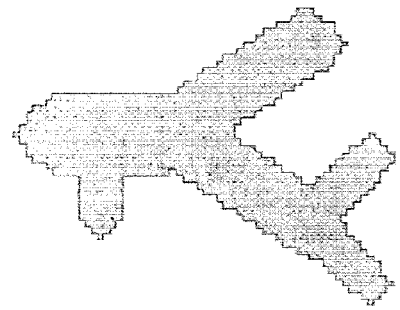
FIG. 16 is a pair of images illustrating an artery tree with numerous branches and the results of radius labeling according to an exemplary embodiment of the present invention.
Figure 16:
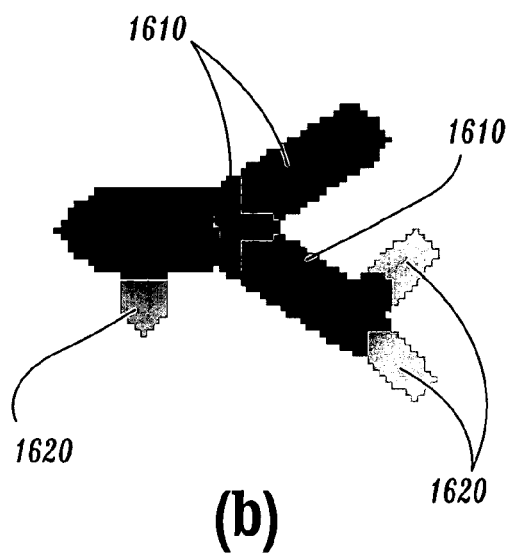

Using the previously described descent strategy on the distance map, an extension of this is to perform radius labeling with the value of the deepest point that can be reached. This can be defined for any point inside a shape. For example, (a) and (b) of FIG. 16 illustrate an artery tree with numerous branches. However, as (b) was created using radius labeling, darker shades 1610 can be seen indicating a larger radius and lighter shades 1620 can be seen indicating a smaller radius. This enables different radii of different parts of an arterial or vessel tree structure to be determined. In addition, this technique can be used to perform shape simplification, for example, the removal of small image components or shape analysis for determining the genealogy of a tubular tree structure. Further, as applied to an exemplary embodiment of the present invention, radius labeling is used to prune branches of the vessel tree where the vessel is too small in diameter to do a meaningful diagnosis of a pulmonary embolism. It should also be understood that this technique may be applied to the bronchi, colon or other tubular structures.

It is to be further understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It should also be understood that the above description is only representative of illustrative embodiments. For the convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be implemented without departing from the spirit and scope of the present invention.

It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A method for visualizing a tree structure in medical image data, comprising:
   segmenting the tree structure in the image data;
   coloring an exterior of the tree structure using data associated with interior components of the tree structure; and
   outputting an image of the tree structure colored by the interior components of the tree structure,
   wherein the step of coloring an exterior of the tree structure comprises:
   determining a path to a vessel centerline for voxels on a surface of the tree structure;
   determining a function result based on voxel values along the path; and
   assigning the function result to the surface of the tree structure.

2. The method of claim 1, wherein the tree structure is a vessel tree.

3. The method of claim 2, wherein the vessel tree is a pulmonary vessel tree.

4. The method of claim 3, wherein the step of segmenting the tree structure comprises:
   generating a mask of a lung;
   thresholding components within the lung mask;
   size-labeling voxels in the thresholded lung mask according to a radius of the tree structure;
   removing voxels with size labels below a first threshold;
   labeling connected components within the thresholded lung mask; and
   removing components below a second threshold in volume.

5. The method of claim 4, wherein the step of size-labeling voxels in the thresholded lung mask comprises:
   labeling the voxels in the tree structure with their distance from a surface of the tree structure;
   determining a path to a centerline of a vessel in the tree structure for the labeled voxels; and
   assigning a largest distance value along the path to all voxels in the path.

6. The method of claim 1, wherein the value of the voxels along the path is one of an average function, minimum function and function of a first quartile of path values.

7. The method of claim 1, wherein the step of coloring an exterior of the tree structure further comprises:
   removing false positive regions using a classifier.

8. The method of claim 7, wherein the step of removing false positive regions using a classifier comprises:
   collecting features of the image data, wherein the features of the image data are one of sizes and gray-level values inside the tree structure; and
   removing false positives using the classifier, wherein the classifier includes a gray-level operator for removing false positive regions based on their size.

9. The method of claim 1, wherein the image data is acquired using one of a computed tomography (CT), helical CT and magnetic resonance (MR) imaging technique.

10. The method of claim 1, wherein the interior components of the tree structure are one of an embolism and airway plug.

11. A system for visualizing a tree structure in medical image data, comprising:
    a memory device for storing a program;
    a processor in communication with the memory device, the processor operative with the program to:
    segment the tree structure in the image data;
    color an exterior of the tree structure using data associated with interior components of the tree structure; and
    output an image of the tree structure colored by the interior components of the tree structure,
    wherein the processor is further operative with the program code when coloring an exterior of the tree structure to:
    determine a path to a vessel centerline for voxels on a surface of the tree structure;
    determine a function result based on voxel values along the path; and
    assign the function result to the surface of the tree structure.

12. The system of claim 11, wherein the processor is further operative with the program code to:
    generate a mask of a lung when the tree structure is a pulmonary vessel tree;
    threshold components within the lung mask;
    size-label voxels in the thresholded lung mask according to a radius of the tree structure;
    remove voxels with size labels below a first threshold;
    label connected components within the thresholded lung mask; and
    remove components below a second threshold in volume.

13. The system of claim 12, wherein the processor is further operative with the program code when size-labeling voxels in the thresholded lung mask to:
    label the voxels in the tree structure with their distance from a surface of the tree structure;
    determine a path to a centerline of a vessel in the tree structure for the labeled voxels; and
    assign a largest distance value along the path to all voxels in the path.

14. The system of claim 11, wherein the processor is further operative with the program code when coloring an exterior of the tree structure to:
    remove false positive regions using a classifier.

15. The system of claim 14, wherein the processor is further operative with the program code when removing false positive regions using a classifier to:
    collect features of the image data, wherein the features of the image data are one of sizes and gray-level values inside the tree structure; and
    remove false positives using the classifier, wherein the classifier includes a gray-level operator for removing false positive regions based on their size.

16. The system of claim 11, wherein the image data is acquired using one of a computed tomography (CT), helical CT and magnetic resonance (MR) imaging device.

17. The system of claim 11, wherein the tree structure is a vessel tree.

18. The system of claim 17, wherein the vessel tree is a pulmonary vessel tree.

19. The system of claim 11, wherein the value of the voxels along the path is one of an average function, minimum function and function of a first quartile of path values.

20. The system of claim 11, wherein the interior components of the tree structure are one of an embolism and airway plug.

21. A computer readable medium tangibly embodying a program of instructions executable by a processor to perform method steps for visualizing a tree structure in medical image data, the method steps comprising:
    segmenting the tree structure in the image data;
    coloring an exterior of the tree structure using data associated with interior components of the tree structure; and outputting an image of the tree structure colored by the interior components of the tree structure, wherein the step of coloring an exterior of the tree structure comprises:

determining a path to a vessel centerline for voxels on a surface of the tree structure;

determining a function result based on voxel values along the path; and assigning the function result to the surface of the tree structure.

* * * * *